United States Patent
Anello et al.

(10) Patent No.: US 6,195,356 B1
(45) Date of Patent: Feb. 27, 2001

(54) SWITCHER FOR SPANNING SUBNETWORKS

(75) Inventors: Michael Anello, Del Mar; Christopher H. Bracken, Poway; Fazil Osman, Escondido, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/991,614

(22) Filed: Dec. 17, 1997

(51) Int. Cl.$^7$ .................................................. H04L 12/56
(52) U.S. Cl. ............................ 370/398; 370/400; 709/238
(58) Field of Search .................................. 370/389, 390, 370/392, 393, 395, 396, 397, 400, 398; 395/200.68, 200.72; 709/238

(56) References Cited

U.S. PATENT DOCUMENTS

| | | | |
|---|---|---|---|
| 5,384,766 | * 1/1995 | Yamato et al. | 370/244 |
| 5,583,862 | * 12/1996 | Callon | 370/397 |
| 5,732,071 | * 3/1998 | Saito et al. | 370/255 |
| 5,790,541 | * 8/1998 | Patrick et al. | 370/392 |

* cited by examiner

Primary Examiner—Ajit Patel
Assistant Examiner—Bob A. Phunkulh
(74) Attorney, Agent, or Firm—Fish & Richardson PC

(57) ABSTRACT

An apparatus and method that allows a layer 2 "spanning" switch to switch data packets between subnets based upon layer 3 packet addresses. The "spanning" switch on a subnet can offer itself as a destination for data packets crossing to another subnet. Through a configuration process, a layer 2 switch is taught how to forward data packets between two stations on different subnets. The switch can then teach the two stations how to communicate via the layer 2 switch. The layer 2 switch is allocated a "virtual" IP address on each subnet for each station that wants to be involved in cross-subnet communications. More particularly, the invention includes a method for switching data packets between subnets of a network having frame and packet addresses, comprising the steps of: configuring a switching device coupled to each subnet to have a virtual packet address on each subnet associated with a packet address of a station on another subnet; providing a designated station on each subnet with the virtual packet address on such subnet and with an address for the associated station on another subnet; providing a frame address of a destination station on another subnet in response to requests from a designated station on a subnet relating to transmitting data packets to the destination station; and switching data packets from such designated station to the destination station through the switching device in response to the presence of the frame address in such data packets. The invention includes related apparatus and computer programs.

6 Claims, 2 Drawing Sheets

SWITCHER FOR SPANNING SUBNETWORKS

TECHNICAL FIELD

This invention relates to network packet transmission, and more particularly to a method and apparatus for switching packets between subnetworks.

BACKGROUND

Data transmission systems enable a number of nodes or "stations" to communicate with each other at high speeds at a distance. A station may be any one of a number of different types of devices, including computers and printers. The combination of a data transmission system and a number of stations coupled to the data transmission system is commonly known as a network. Networks transmit data and control information by addressed protocol data units, known as "frames" or "packets" depending on context. Stations typically include hardware and software for coupling the station to a data transmission system, generally using a common communication protocol. Examples of networks include Fiber Distributed Data Interface (FDDI), Token Ring, and Ethernet™ local area networks (LANs) and the Internet™ wide area network (WAN).

The overall architecture of most modern networks conforms to some close variant of the Open Systems Interconnect (OSI) reference model promulgated by the International Standards Organization as the "ideal" network architecture. This model outlines seven areas, or layers, for the network. These layers (from highest to lowest) are: Applications; Presentation; Session; Transport; Network; Data Link; and Physical. The last three layers are of interest here.

The Physical layer (layer 1) defines cable, connector and signaling specifications. The Data Link layer (layer 2) is generally broken into two sub-layers: Logical Link Control (LLC) on the upper half, and Medium Access Control (MAC) on the lower half, which deals with getting protocol data units on and off the physical layer. The Network layer (layer 3) makes certain that protocol data units sent from one station to another station actually gets to the desired destination in a reasonable period of time. Routing and flow control of protocol data units are performed in layer 3. Technically, layer 2 protocol data units are called frames, while layer 3 protocol data units are known as packets. However, protocol data units are often referred to generically as packets.

Many networks, such as FDDI, Token Ring and Ethernet LANs, are shared medium networks. In a shared medium environment, as the number of users on the network increases, the bandwidth available to each user decreases and performance degrades. Accordingly, network "switches" are often added to networks to link smaller segments of a network, thereby reducing the number of stations per network segment and improving performance. When a Layer 2 switch connects separate segments of a network, a form of frame switching takes place. Alternatively, a network can be split into subnetworks (subnets) connected by routers. When a Layer 3 router connects subnets, a form of packet switching takes place.

Switches (or "bridges") perform very fast bridging between small network segments with minimal network congestion. A layer 2 switch operates on frames at the MAC layer. Frames on a network are encoded using a definition referred to as a MAC format. On an IEEE 802 network (which includes Ethernet), frames are built around a MAC format which utilizes 6-byte station addresses. A frame sent from one station to another station on the same network includes two of these 6-byte addresses, a destination station address and a source station address. These 6-byte addresses are usually referred to as MAC addresses and every station has a unique 6-byte address. The two 6-byte addresses are contained in the MAC header portion of every frame sent on the network.

A layer 2 switch uses the two 6-byte MAC addresses to move frames between input and output ports of the switch. As frames arrive in a layer 2 switch, the destination address is extracted from the arriving frame. The switch looks up the destination address in a forwarding table and determines to which port on the switch the current frame should be sent. This process is called forwarding. The source address is extracted and added to the forwarding table if not already present. This process is known as "learning". Through this process of learning and forwarding, a layer 2 switch moves frames between its ports.

More particularly, when a switch receives a frame, it compares the frame's destination address with addresses in the forwarding table. One of these situations results:

If the frame's MAC destination address is on the same LAN segment as its source address, the switch discards the frame; all stations on that LAN have already received this frame.

If the frame's MAC destination address is on a different LAN segment than its source address, the switch forwards the frame to that LAN segment.

If there is no match for the frame's MAC destination address in the forwarding table, the switch forwards the frame to all coupled network segments except the one that received the frame. This is called flooding.

A router is a network device which operates on packets at a higher layer, typically layer 3. Layer 3 protocols, such as the Internet Protocol (IP), utilize their own addressing mechanism which is quite different than the 6-byte MAC addresses used in layer 2. These addresses in IP version 4 "IPv4" are 4-bytes in length. A data packet typically has the following layout, showing both layer 2 and layer 3 addresses:

| Packet Layout | | | | |
|---|---|---|---|---|
| Layer 2 (MAC) Header | | Layer 3 (IP) Header | | |
| MAC Destination Address | MAC Source Address | IP Source Address | IP Destination Address | Packet Data |

In order for data packets to be sent between stations on different Layer 3 addressed subnets ("IP subnets"), a router is used. The router accepts packets from an input port connected to one IP subnet when the packets are addressed at layer 2 to the router. Such packets are destined for stations on another IP subnet connected to an output port of the router. The destination for the packet is defined by the layer 3 address contained in the packet. The router looks up the layer 3 address in an internal routing table, determines the destination layer 2 address that should receive the packet (which may be another router), and substitutes this new layer 2 address for the old layer 2 address within the packet. The packet is then sent out the appropriate destination port on the router to the destination IP subnet.

Because routing involves changes to the data packet as the router moves a packet from input port to output port, a router introduces delays into the movement of packets in the network. This delay is referred to as latency. For example, a typical router might be able to examine and route about 1,000 packets per second.

Layer 2 switches do not modify the packet and thus the latency surrounding switching is significantly smaller than the latency for routing. For example, a typical switch may be able to switch frames at a rate 10 times or more faster than a typical router. However, layer 2 switches do not examine the layer 3 address, and thus cannot switch packets between IP subnets.

Accordingly, the inventors have determined that it would be useful to have an apparatus and method that would allow switching of frames between IP subnets based upon layer 3 addresses. The present invention provides such an apparatus and method.

SUMMARY

The invention includes an apparatus and method that allows a layer 2 "spanning" switch to switch data packets between IP subnets based upon layer 3 packet addresses. The invention allows designated stations attached to different IP subnets to communicate with each other without the need for a router between the subnets. The invention thus provides high speed point-to-point connectivity between the different subnets.

The invention may be used in conjunction with a conventional router to permit general low-speed layer 3 inter-subnet communication through the router, and high-speed point-to-point layer 2 inter-subnet communication through the spanning switch.

The invention can be implemented within a layer 2 switch to allow the switch to move data packets between attached subnets. By using layer 2 switching techniques, the invention permits high speed movement of data packets between IP subnets. The invention may be implemented in hardware or software, or a combination of both.

The invention uses the fact that hosts on an IP network keep track of where to send data packets on different subnets in a table. Using conventional Internet Control Message Protocol (ICMP) "Redirect Packet" messages, a "spanning" switch on a subnet can offer itself as a destination for data packets crossing to another subnet. Through a configuration process, a layer 2 switch is taught how to forward data packets between two stations on different subnets. The switch can then teach the two stations how to communicate via the layer 2 switch. The layer 2 switch is allocated a "virtual" IP address on each subnet for each station that wants to be involved in cross-subnet communications.

More particularly, one aspect of the invention includes a method for switching data packets between subnets of a network having frame and packet addresses, comprising the steps of: configuring a switching device coupled to each subnet to have a virtual packet address on each subnet associated with a packet address of a station on another subnet; providing a designated station on each subnet with the virtual packet address on such subnet and with an address for the associated station on another subnet; providing a frame address of a destination station on another subnet in response to requests from a designated station on a subnet relating to transmitting data packets to the destination station; switching data packets from such designated station to the destination station through the switching device in response to the presence of the frame address in such data packets. The invention includes related apparatus and computer programs.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
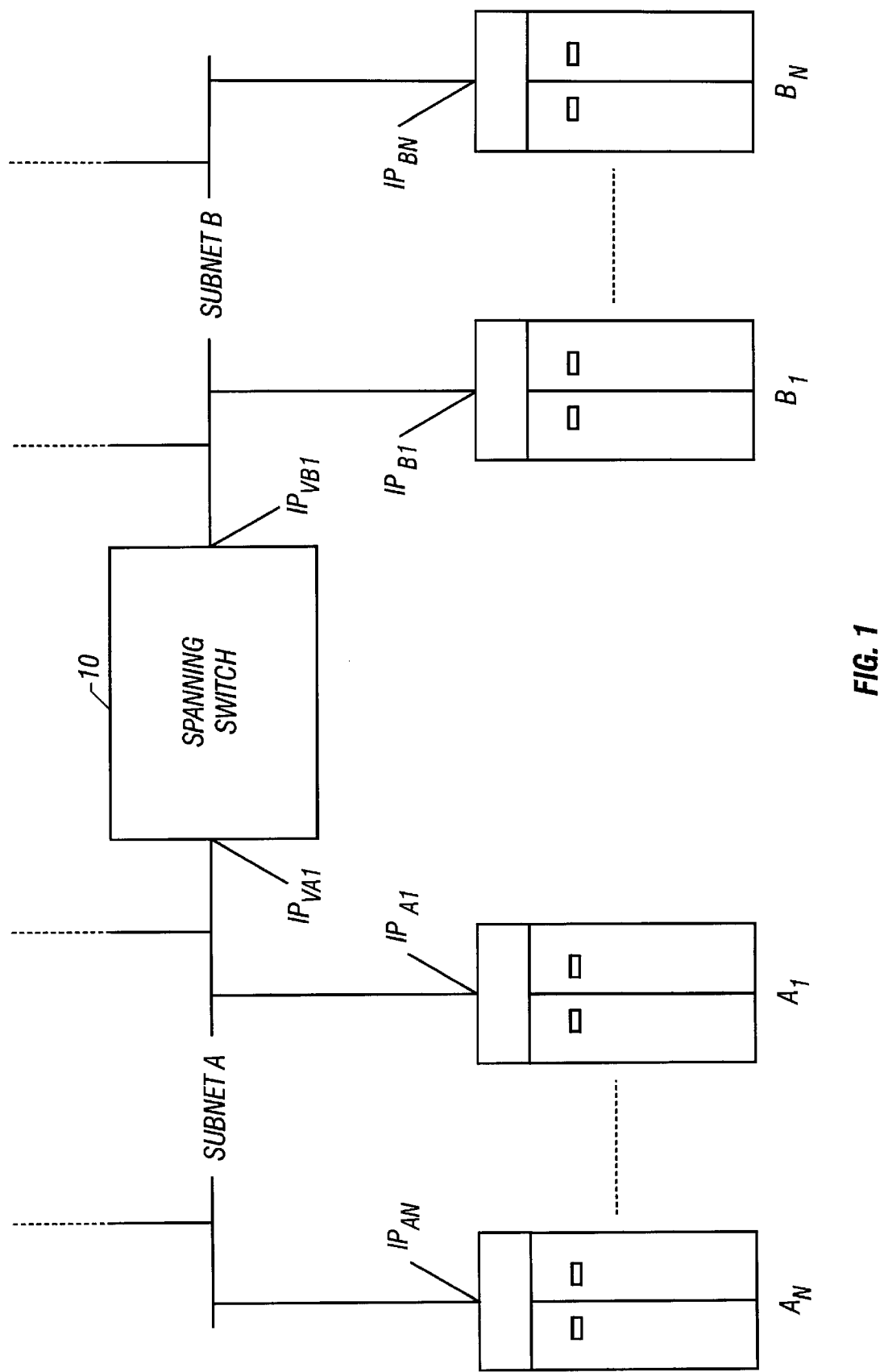
FIG. 1 is a block diagram of a preferred embodiment of the invention.

FIG. 1 is a block diagram of a preferred embodiment of the invention. A set of stations $A_1 \ldots A_N$ are coupled to a IP subnet A, and a set of a set of stations $B_1 \ldots B_N$ are coupled to an similar subnet B. Each station on a subnet A, B is physically and logically connected to a "spanning" switch 10 but is logically disconnected from stations on the other subnet B, A. For an ordinary switch using layer 2 addressing, this configuration would mean that traffic could not be forwarded between the subnets A, B as is required for proper operation of the Internet Protocol (IP). Normally, in order for station $A_1$ to communicate with station $B_1$, a router instead of a switch would be required to route data packets using layer 3 addresses.

However, using the invention, a "virtual" IP address on one subnet is defined and can be used by a designated station on that subnet to send data to a designated station on another subnet. For example, station $A_1$ can send a data packet addressed to a virtual address on subnet A but with an ultimate destination for station $B_1$ on subnet B. The invention provides a mechanism whereby the data packet is mapped to station $B_1$.

Figure 2:
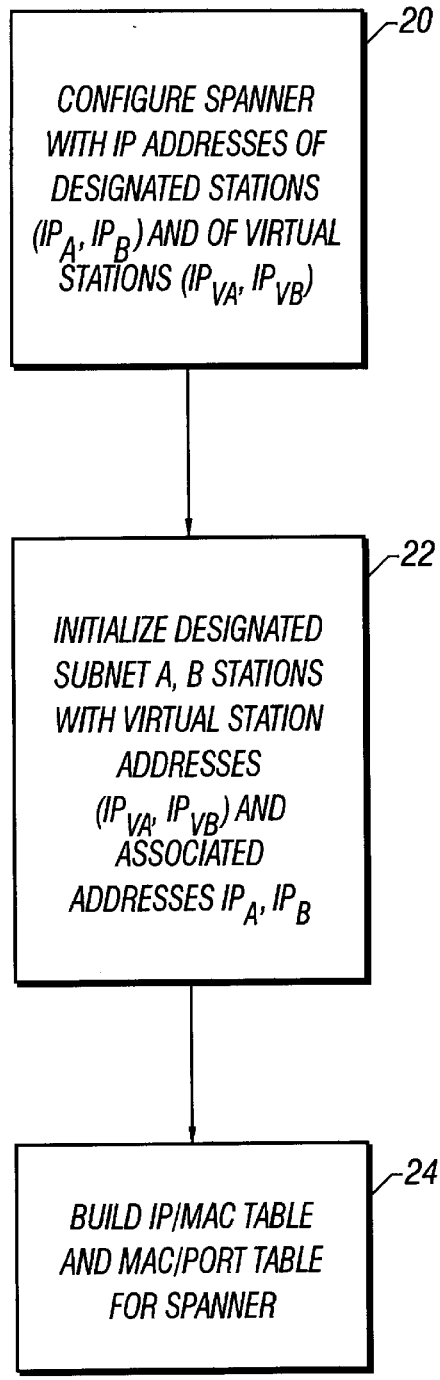
FIG. 2 is a flow chart showing the setup process in accordance with the preferred embodiment of the invention.

FIG. 2 is a flow chart showing the setup process in accordance with the preferred embodiment of the invention. In one embodiment, a network administrator provides to the spanning switch 10 the following configuration information (STEP 20):

The IP address of a designated station from each subnet A, B (e.g., stations $A_1$ and $B_1$), such as $IP_{A1}$ and $IP_{B1}$.

Corresponding IP addresses on each subnet A, B that are to be the "virtual" IP address for communicating with the other subnet, such as $IP_{VA1}$ and $IP_{VB1}$. There is one virtual IP address per designated station on each subnet.

The IP address information may be entered by means of a console keyboard associated with the spanning switch 10, or by means of remote entry program executing from a station within one of the subnets A, B. The spanning switch 10 itself has its own IP address on each subnet A, B, for communication directly with the switch. There may be more than two subnets coupled through the spanning switch 10. A suitable spanning switch 10 may be, for example, a Millennium 4000™ switch from XLNT Designs, Inc. of California, suitably programmed in accordance with the present invention.

In an alternative embodiment, the virtual addresses may be automatically assigned to the spanning switch 10 by means, for example, of a control protocol such as the Dynamic Host Control Protocol (DHCP).

The spanning switch 10 then initializes each designed station by transmitting the virtual address information corresponding to each subnet to the designated station on that subnet, along with an associated station address (STEP 22). For example, the $IP_{VA1}$ address and associated station address $IP_{B1}$ of station $B_1$ is transmitted to the $IP_{A1}$ address of station $A_1$, and the $IP_{VB1}$ address and associated station address $IP_{A1}$ of station A, is transmitted to the $IP_{B1}$ address of station $B_1$. In the preferred embodiment, the spanning switch 10 sends the initialization information by means of a standard ICMP "Redirect Packet". This data packet essentially associates a station with an IP address. Thus, the virtual address information in each message informs the receiving station of the IP address that station should use for sending data packets to a station on the other subnet. The address a station on subnet A uses is a subnet A IP address, while the address a station on subnet B uses is a subnet B IP address.

As a third step on the preferred setup process, the spanning switch 10 also builds an IP/MAC table that maps virtual IP addresses (layer 3) on each subnet to the MAC address (layer 2) of the corresponding station on the other subnet (STEP 24). For example, the spanning switch 10 would build a table that maps $IP_{VA1}$ to the MAC address of station $B_1$, and $IP_{VB1}$ to the MAC address of station $A_1$. The MAC addresses may be determined by the spanning switch 10 by using the well-known "Ping" program to find the IP address $IP_{A1}$, $IP_{B1}$ of each designated station. The spanning switch 10 also builds a table mapping MAC addresses to port addresses, in known fashion.

Figure 3:
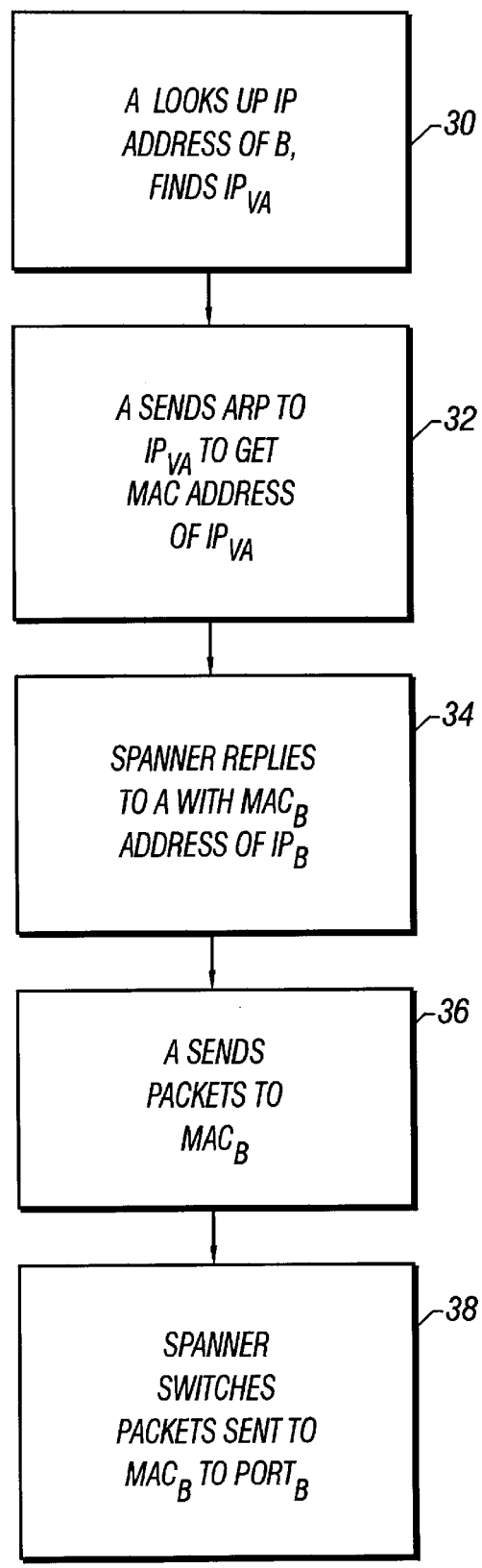
FIG. 3 is a flow chart showing the operational process in accordance with the preferred embodiment of the invention.

FIG. 3 is a flow chart showing the operational process in accordance with the preferred embodiment of the invention. When, for example, station $A_1$ on subnet A wants to send a data packet to station $B_1$ on subnet B, station $A_1$ looks up the IP address for station $B_1$ in an internal table, in known fashion (STEP 30). Because station $A_1$ was "told" by the spanning switch 10 that the IP address of station $B_1$ was $IP_{VA1}$ (an address on subnet A), station $A_1$ will retrieve the $IP_{VA1}$ address from the lookup table. Station A, then uses the $IP_{VA1}$ address as a destination address for a standard Address Resolution Protocol (ARP) command packet broadcast on subnet A to determine the MAC address corresponding to the virtual IP address $IP_{VA1}$ (STEP 32).

The spanning switch 10 receives the broadcast ARP command packet. Since the spanning switch 10 is aware that it is controlling the virtual IP address $IP_{VA1}$, the spanning switch 10 looks up that IP address in an internal IP/MAC table and retrieves the corresponding MAC address, $MAC_B$, of the actual destination, station $B_1$, previously associated with the received virtual IP address. The spanning switch 10 then broadcasts back on subnet A an ARP Reply packet with the $MAC_B$ address of station $B_1$ (STEP 34).

Thereafter, station $A_1$ sends data packets addressed to station $B_1$ using the $MAC_B$ address of station $B_1$ as the MAC Destination Address in the layer 2 frame header (STEP 36). The spanning switch 10 now can treat such data packets at the layer 2 level and forward the data packets from station $A_1$ on subnet A to station $B_1$ on subnet B. In particular, the spanning switch 10 switches each data packet with a destination address of $MAC_B$ to a corresponding $Port_B$, as determined by the MAC/Port Table of the spanning switch 10 (STEP 38). Since each data packet from station $A_1$ carries a source MAC address for station $A_1$, station $B_1$ can easily address replies through the spanning switch 10 to station $A_1$ using the MAC address.

Accordingly, the invention allows designated stations on logically disjoint IP subnets to communicate at high speed by means of layer 2 forwarding mechanisms. The invention allows data packets to traverse IP subnets without the intervention of a layer 3 router and their inherent latency requirements. However, the invention may be used in conjunction with a conventional router to permit general low-speed layer 3 inter-subnet communication through the router, and high-speed point-to-point layer 2 inter-subnet communication through the spanning switch. This may be useful, for example, when a few users require a significant amount of bandwidth across subnets, and the per-packet latency overhead of routers would impair the performance of a subnet for all users. The invention would provide a fast point-to-point connection for the high-bandwidth users, while permitting other uses to send cross-subnet data packets by means of a conventional router.

The invention can be implemented within a layer 2 switch to allow the switch to move data packets between attached subnets. By using layer 2 switching techniques, the invention permits high speed movement of data packets between IP subnets.

The invention may be implemented in hardware or software, or a combination of both. However, preferably, the invention is implemented in computer programs executing on programmable computers each comprising at least one processor, at least one data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM, CDROM, or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. For example, although it is preferred to build the IP/MAC table for the spanning switch 10 during the setup process (STEP 24), the table could instead be built at a later time, such as when a station first attempts to send a data packet across to another subnet (for example, during STEP 34). As another example, some of the process steps may be done in other orders. For example, STEP 24 may be done before STEP 22. As yet another example, although the term "IP subnets" has been used, the invention may be used with any Layer 3 addressing protocol. Accordingly, other embodiments are within the scope of the following claims.

What is claimed is:

1. A method for switching data packets between subnets of a network having frame and packet addresses, comprising the steps of:

(a) configuring a switching device coupled to each subnet to have a virtual packet address on each subnet associated with a packet address of a station on another subnet;

(b) providing a designated station on at least a first subnet with the virtual packet address on such first subnet and with an address for the associated station on a second subnet;
(c) providing a frame address of a destination station on the second subnet in response to a request from the designated station for transmitting data packets to the destination station,
  addressing the request from the designated station to the virtual packet address on the first subnet,
  receiving the request in the switching device,
  determining a frame address for a destination station on the second subnet associated with the virtual packet address, and
  providing the determined frame address to the designated station; and
(d) switching data packets from the designated station to the destination station through the switching device in response to the presence of the frame address in such data packets.

2. A method for switching data packets between subnets A, B of a network having frame and packet addresses, comprising the steps of:
  (a) configuring a switching device coupled to each subnet A, B to have a virtual packet address $IP_{VA}$ on subnet A associated with a station B on subnet B, and a virtual packet address $IP_{VB}$ on subnet B associated with a station A on subnet A;
  (b) providing station A on subnet A with the virtual packet address $IP_{VA}$ and with an associated address for station B on subnet B;
  (c) providing station B on subnet B with the virtual packet address $IP_{VB}$ and with an associated address for station A on subnet A;
  (d) mapping a frame address for station B to the virtual packet address $IP_{VA}$;
  (e) mapping a frame address for station A to the virtual packet address $IP_{VB}$;
  (f) transmitting data packets from station A to station B by the steps of:
    (1) looking up the address of station B and determining the associated virtual packet address $IP_{VA}$;
    (2) transmitting a request across subnet A for the frame address corresponding to virtual packet address $IP_{VA}$;
    (3) receiving the request in the switching device;
    (4) looking up the frame address for station B mapped to the virtual packet address $IP_{VA}$;
    (5) providing the frame address for station B to station A;
    (6) addressing data packets from station A to the frame address for station B;
    (7) switching the data packets from station A to station B by reference to the frame address.

3. A computer program, residing on a computer-readable medium, for switching data packets between subnets of a network having frame and packet addresses, comprising instructions for causing a computer to:
  (a) configure a switching device coupled to each subnet to have a virtual packet address on each subnet associated with a packet address of a station on another subnet;
  (b) provide a designated station on at least a first subnet with the virtual packet address on such first subnet and with an address for the associated station on a second subnet;
  (c) provide a frame address of a destination station on the second subnet in response to a request from the designated station for transmitting data packets to the destination station
    address the request from the designated station to the virtual packet address on the first subnet,
    receive the request in the switching device,
    determine a frame address for a destination station on the second subnet associated with the virtual packet address, and
    provide the determined frame address to the designated station; and
  (d) switch data packets from the designated station to the destination station through the switching device in response to the presence of the frame address in such data packets.

4. A computer program, residing on a computer-readable medium, for switching data packets between subnets A, B of a network having frame and packet addresses, comprising instructions for causing a computer to:
  (a) configure a switching device coupled to each subnet A, B to have a virtual packet address $IP_{VA}$ on subnet A associated with a station B on subnet B, and a virtual packet address $IP_{VB}$ on subnet B associated with a station A on subnet A;
  (b) provide station A on subnet A with the virtual packet address $IP_{VA}$ and with an associated address for station B on subnet B;
  (c) provide station B on subnet B with the virtual packet address $IP_{VB}$ and with an associated address for station A on subnet A;
  (d) map a frame address for station B to the virtual packet address $IP_{VA}$;
  (e) map a frame address for station A to the virtual packet address $IP_{VB}$;
  (f) transmit data packets from station A to station B by:
    (1) looking up the address of station B and determining the associated virtual packet address $IP_{VA}$;
    (2) transmitting a request across subnet A for the frame address corresponding to virtual packet address $IP_{VA}$;
    (3) receiving the request in the switching device;
    (4) looking up the frame address for station B mapped to the virtual packet address $IP_{VA}$;
    (5) providing the frame address for station B to station A;
    (6) addressing data packets from station A to the frame address for station B;
    (7) switching the data packets from station A to station B by reference to the frame address.

5. A switch for switching data packets between subnets of a network having frame and packet addresses, comprising:
  (a) means for configuring the switch to have a virtual packet address on each subnet associated with a packet address of a station on another subnet;
  (b) means for providing a designated station on at least a first subnet with the virtual packet address on such first subnet and with an address for the associated station on a second subnet;
  (c) means for providing a frame address of a destination station on the second subnet in response to a request from the designated station for transmitting data packets to the destination station,
    means for receiving a request from the designated station addressed to the virtual packet address on the first subnet,
    means for determining a frame address for a destination station on the second subnet associated with the virtual packet address, and means for providing the determined frame address to the designated station; and (d) means for switching data packets from the designated station to the destination station through the switch in response to the presence of the frame address in such data packets.

6. A switch for switching data packets between subnets A, B of a network having frame and packet addresses, comprising:

(a) means for configuring the switch to have a virtual packet address $IP_{VA}$ on subnet A associated with a station B on subnet B, and a virtual packet address $IP_{VB}$ on subnet B associated with a station A on subnet A;

(b) means for providing station A on subnet A with the virtual packet address $IP_{VA}$ and with an associated address for station B on subnet B;

(c) means for providing station B on subnet B with the virtual packet address $IP_{VB}$ and with an associated address for station A on subnet A;

(d) means for mapping a frame address for station B to the virtual packet address $IP_{VA}$;

(e) means for mapping a frame address for station A to the virtual packet address $IP_{VB}$;

(f) means for transmitting data packets from station A to station B by:

(1) looking up the address of station B and determining the associated virtual packet address $IP_{VA}$;

(2) transmitting a request across subnet A for the frame address corresponding to virtual packet address $IP_{VA}$;

(3) receiving the request in the switch;

(4) looking up the frame address for station B mapped to the virtual packet address $IP_{VA}$;

(5) providing the frame address for station B to station A;

(6) addressing data packets from station A to the frame address for station B;

(7) switching the data packets from station A to station B by reference to the frame address.

* * * * *

UNITED STATES PATENT AND TRADEMARK OFFICE
CERTIFICATE OF CORRECTION

PATENT NO.    : 6,195,356 B1
DATED         : February 27, 2001
INVENTOR(S)   : Michael Anello, Fazil Osman and Christopher H. Bracken It is certified that error appears in the above-identified patent and that said Letters Patent is hereby corrected as shown below:

<u>Title page,</u>
Item [73], Assignee, please delete "Intel Corporation, Santa Clara, CA (US)" and substitute therefor -- XLNT Designs, Inc., San Diego, CA (US) --.

Signed and Sealed this

Twelfth Day of August, 2003

JAMES E. ROGAN
*Director of the United States Patent and Trademark Office*